(12) United States Patent
Lange et al.

(10) Patent No.: US 6,289,435 B1
(45) Date of Patent: Sep. 11, 2001

(54) RE-USE OF SPECIAL PURPOSED REGISTERS AS GENERAL PURPOSE REGISTERS

(75) Inventors: Eric W. Lange; Sam Dicker, both of Santa Cruz; Vince Vu, Berkeley; Steven Hoge, Santa Cruz, all of CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/313,462

(22) Filed: May 17, 1999

(51) Int. Cl.[7] .................................................... G06F 12/00
(52) U.S. Cl. ................... 712/32; 712/1; 712/26; 711/1
(58) Field of Search .................. 712/1, 32, 26, 712/36, 38; 711/1, 5, 100

(56) References Cited

U.S. PATENT DOCUMENTS

| | | | |
|---|---|---|---|
| 4,355,355 | * 10/1982 | Butwell et al. ...................... | 711/208 |
| 4,745,547 | * 5/1988 | Buchholz et al. ...................... | 712/4 |
| 4,979,098 | * 12/1990 | Baum et al. .......................... | 711/208 |
| 5,210,840 | * 5/1993 | Fukagawa et al. ................... | 711/220 |
| 5,220,669 | * 6/1993 | Baum et al. .......................... | 709/108 |
| 5,307,496 | * 4/1994 | Ichinose et al. ..................... | 709/104 |
| 5,615,385 | * 3/1997 | Fetterman et al. ..................... | 712/23 |

* cited by examiner

*Primary Examiner*—John A. Follansbee
*Assistant Examiner*—Dzung C. Nguyen
(74) *Attorney, Agent, or Firm*—Townsend and Townsend and Crew LLP

(57) ABSTRACT

A method and system for re-using special purpose registers as general purpose registers utilized a special variable type to indicate that a variable may safely be stored in a special purpose register. A loader program maintains the table indicating the availability of special purpose registers for variable storage and loads a variable of the special type to an available special purpose register.

5 Claims, 3 Drawing Sheets

RE-USE OF SPECIAL PURPOSED REGISTERS AS GENERAL PURPOSE REGISTERS

BACKGROUND OF THE INVENTION

The present invention relates generally to audio effects processors and more particularly to procedures for more effectively utilizing the resources of the processor.

Advances in semiconductor technology have made possible the inclusion of large numbers of general purpose registers in processors. However, software developers continue to push the limits of the performance of even most advanced processors and the demand for access to GPRs frequently exceeds the supply.

Accordingly, techniques for managing GPRs and other processor resources are continually being improved.

SUMMARY OF THE INVENTION

According to one aspect of the invention, a procedure for reusing special purpose registers as general purpose registers provides software developers with increased GPR resources without modifying the architecture of the processor.

According to another aspect of the invention, the processor includes special purpose registers that store a predetermined number of bits, which is less than the number of bits stored in the GPRs. Developers declare a special GPR variable type for words that may be stored as the predetermined number of bits.

According to another aspect of the invention, a loader program maintains a resource manager indicating the availability of GPRs and special purpose registers. Variables declared as the special GPR variable type may be stored in either in an available GPR, or if enough GPRs are not available, in an available special register.

According to another aspect of the invention, variables declared as the special GPR type are always stored in available special purpose registers.

According to another aspect of the invention, a processor includes an on-chip internal tank RAM (ITRAM) and a set of ITRAM data buffers and ITRAM address buffers. During operation of the processor, some of these buffers will be in the OFF state (not used). Variables stored in ITRAM data and address buffers is persistent (not changed) during the off state. The ITRAM data and address buffers are used by the loader program to store variables declared as the special GPR type.

According to another aspect of the invention, the software developer may declare the use of a variable instead of by its size. The loader determines whether the variable must be stored in a GPR or may be stored in an available special purpose register.

Additional advantages and features of the invention will be apparent in view of the following detailed description and appended drawings.

DESCRIPTION OF THE SPECIFIC EMBODIMENTS

Figure 1:
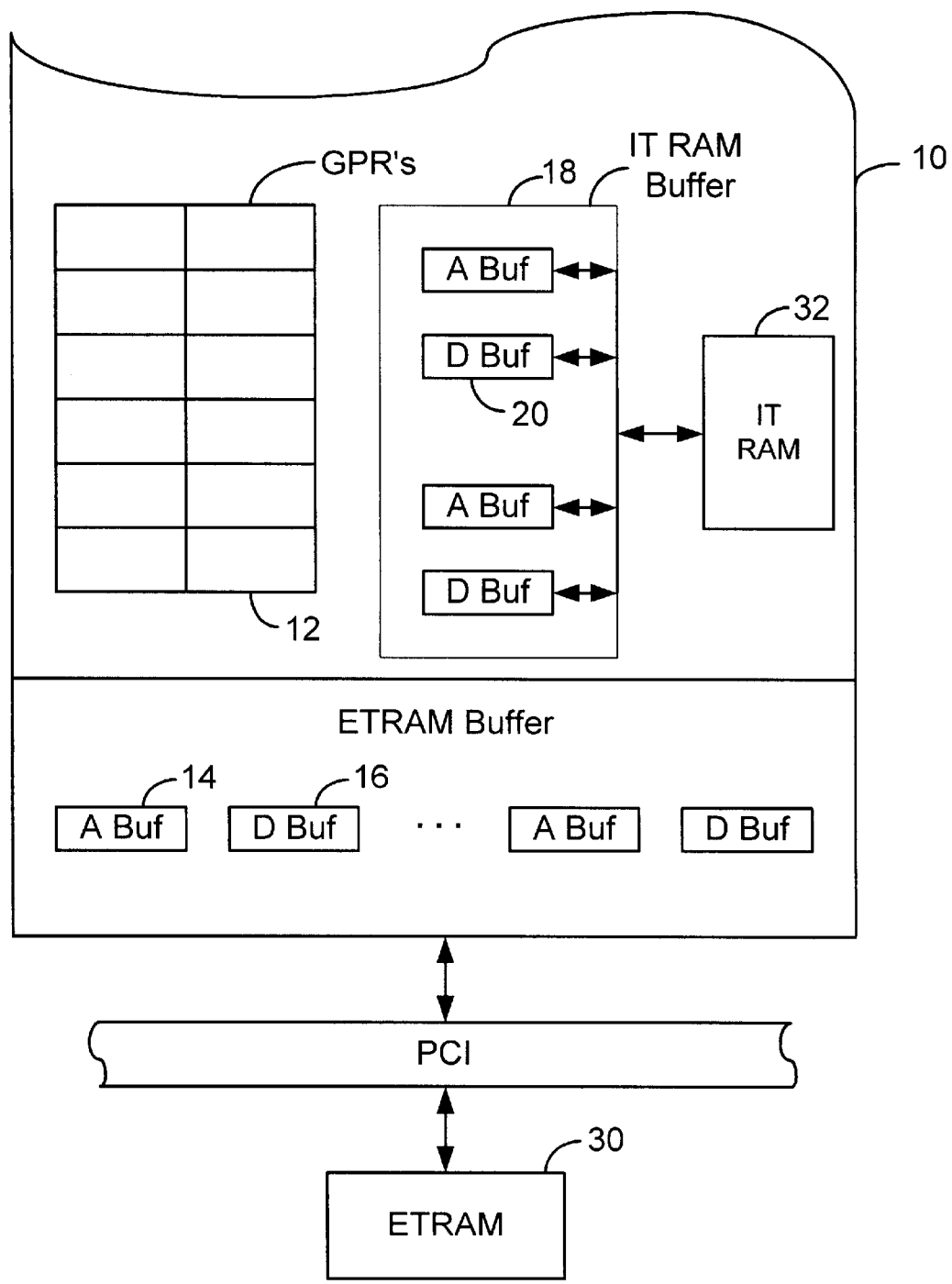
FIG. 1 is a block diagram of part of an audio processing chip.

FIG. 1 is a block diagram of a part of an EMU10K1 audio processor 10, manufactured by the assignee of the present application, including GPRs 10 and special purpose registers. The special purpose are classified as follows: internal tank RAM address buffer registers (ITRAM address registers) 14, internal tank RAM data buffer registers (ITRAM address buffers) 16, external tank RAM address buffer registers (XTRAM address buffers) 18, and external tank RAM data buffer registers (XTRAM data buffers) 20. In the EMU10K1 GPRs 10 are 32 bits wide and the special purpose registers are 20 bits wide.

There is a one-to-one correlation between data and address buffers, i.e., an address register will contain a tank RAM offset to be read or written, and a corresponding data register is used to read or write the actual data. During normal operation, the value in the data register is flushed out to the tank or filled from the tank each sample period, based on the mode of the buffer. The normal operation modes are: read; write, or read, sum, and write. However when a buffer is not in use, its operation mode is "off" meaning that data is neither read from nor written to the tank. In this case, the values in the data and address buffers have no effect. Moreover, any value written registers in the "off" state is persistent so long as the mode remains off.

The external tank RAM 30 can hold up to two megabytes of samples but, due to bandwidth limitations of the PCI bus, there are only 32 accesses available to the external tank RAM an any time. The internal tank RAM 32 is only 8,192 bytes wide but there are 128 simultaneous accesses to it. Thus, host (external) memory is plentiful, but the PCI bus limits the amount data that can be transferred. Conversely, on chip (internal) memory is expensive, but bandwidth is almost unlimited.

Figure 2:
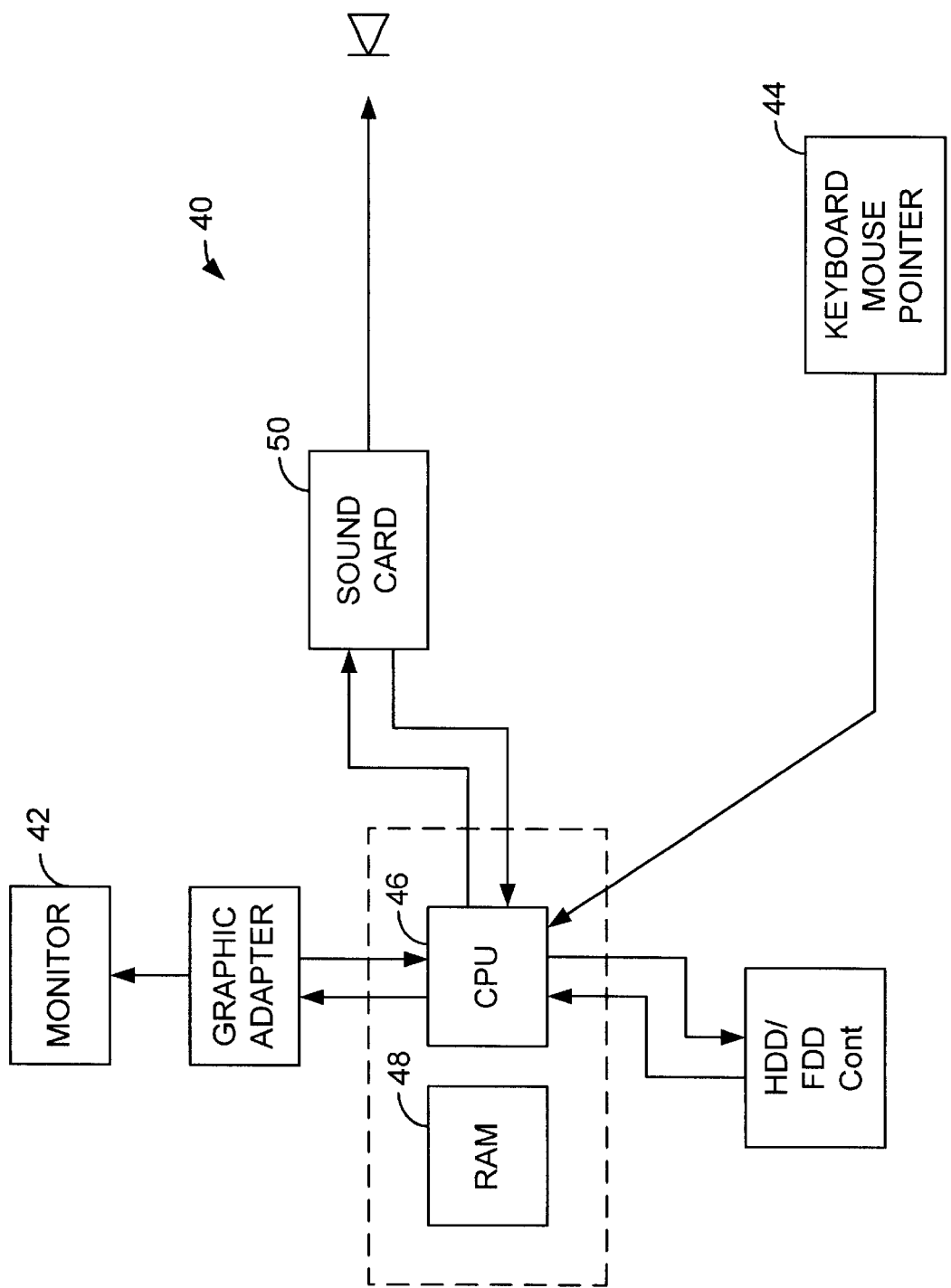
FIG. 2 is a block diagram of a data processing system.

The audio processor chip is generally mounted on a sound card which is connected as a peripheral to a computer system. For example, FIG. 2 depicts a typical computer system 40 including a monitor 42, keyboard, mouse, or other data entry devices 44, a central processing unit (CPU) 46, memory 48, and various peripherals and various peripherals including a sound card 50. As is well known in the art, executable software and data are stored in the memory. The memory, input devices, and peripherals are controlled by operating system software. Application software utilizes the operating system to perform I/O and other standard functions.

Figure 3:
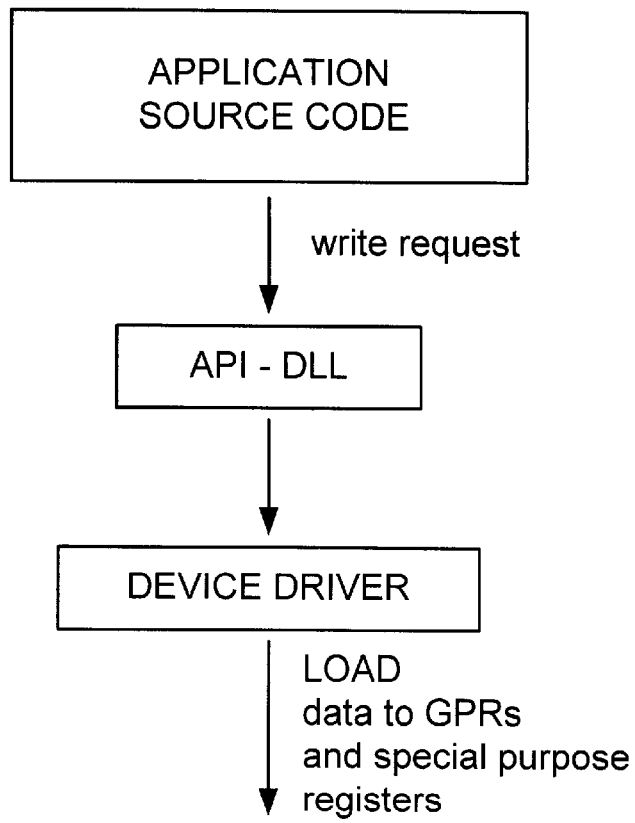
FIG. 3 is a schematic diagram of an application requesting a driver to load data to a device.

FIG. 3 is block diagram of a standard computer operating system, e.g., Microsoft NT®, utilizing a device driver. An application makes a request to write data to a device. This request is passed to a device driver which translates the request and loads data to the device. In case of an audio processor chip, the device driver loads data to registers on the chip.

Typically, application programs are written as source code in a high level language such as C or C++ and variables are declared as specific types. These declarations indicate the type of storage required for the variable. The high level source code is converted by a compiler into code executable by the CPU. Based on the variable type, the application program indicates to the driver the type of storage required for the variable. The driver stores the variables in the correct type of storage locations.

In a preferred embodiment of the invention, a driver for an audio processor chip, e.g., the EMU10K1 manufactured by the assignee of the present invention, includes a loader for loading variables into registers on the audio processor chip. Variables are loaded into the GPRs of the audio processor chip. As described above, in the EMU10K1, the bandwidth to the external tank RAM is limited so that the XTRAM address and data buffers must be dedicated to their special purpose. However, there is an excessive number of available ITRAM address and data buffers. In the preferred embodiment these excess buffers are re-used as general purpose registers.

Because the GPRs and special purpose registers store different size words, 32 and 20 bits respectively, the special purpose registers can not be arbitrarily substituted for GPRs. To solve this problem, in the preferred embodiment a new variable type (BUF GPR) is used for variables that can be adequately represented by 20 bits. For variables of this new type the loader can store the variables in either an available GPR or an available special purpose register. The developer can than declare variables as BUFF GPR if the variables can be safely represented by 20 bits.

Figure 4:
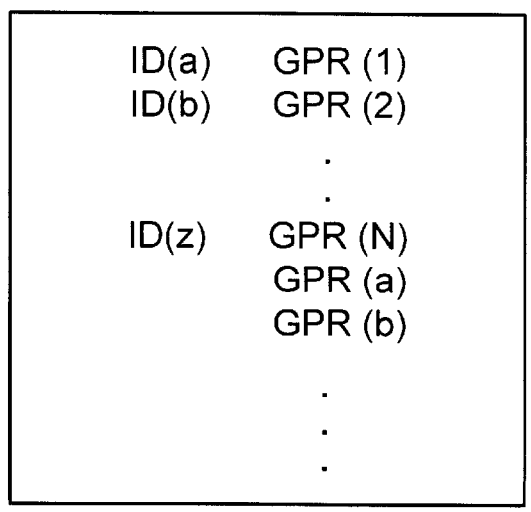
FIG. 4 is a schematic diagram of a resource management table.

FIG. 4 depicts a resource management table maintained by the loader program. In FIG. 3, the GPRs and available special purpose registers are listed on the left side. On the right side a program ID number, identifying a program running on the computer, that is using either a GPR or a special purpose register. In this embodiment, the available special purpose registers are ITRAM address or data buffers in the "off" state. The loader adds or deletes ITRAM buffers from the list depending on the this state.

In one embodiment, variables declared as BUFF GPR are always stored in an available special purpose register. Alternatively, variables declared as BUFF GPR could be written in either an available GPR or an available special purpose register.

In another embodiment, instead of classifying variables by the amount of storage required a developer could classify the variable by its usage, e.g., counter, signal, accumulator, etc. The loader then would determine whether the variable can be stored as 20 bits and, if so, store the variable in an available special purpose register.

The invention has now been described with reference to the preferred embodiments. Alternatives and substitutions will now be apparent to persons of skill in the art. For example, in the above GPRs and special purpose registers having particular bit widths are described but these widths are not critical to the invention. Additionally, it is not necessary that the special purpose registers be ITRAM buffers. Other special purpose registers, some of which are generally available and accessible by the driver software, may also be utilized. Accordingly, it is not intended to limit the invention except as provided by the following claims.

What is claimed is:

1. A method for reusing special purpose registers as general purpose registers, with the registers included on a processor having a fixed number of general purpose registers (GPRs) and a plurality of special purpose registers, with available special purpose registers not in current use being in an off state, and with the general purpose registers having greater storage capacity than the special purpose registers, and where the method is performed by a loader routine executed by a computer, said method comprising the steps of:
   maintaining a resource manager table maintaining availability status of general and special purpose registers;
   determining whether a variable to be loaded to the processor has been declared as a special GPR type variable indicating that the variable is of a size that may be stored in a special purpose register;
   if it has not, loading said variable to an general purpose register on said processor indicated as available by the resource manager table;
   if it has, loading said variable to a general purpose register if a general purpose register is indicated as available by the resource manager table or loading said variable to a special purpose register indicated as available if no general purpose register is indicated as available by the resource manager table.

2. A data processing system comprising:
   a memory storing data and executable programs including a user program and a loader program;
   a sound card peripheral including an audio processing chip having a fixed number of general purpose registers (GPRs) and a plurality of special purpose registers, with available special purpose registers not in current use being in an off state, and with the general purpose registers having greater storage capacity than the special purpose registers;
   a central processing unit for executing programs;
   a bus coupling the memory, sound card, and central processing unit;
      with the central processing unit for executing the loader program
      maintain a resource manager table maintaining availability status of general and special purpose registers;
      determine whether a variable to be loaded to the processor has been declared as a special GPR type variable indicating that the variable is of a size that may be stored in a special purpose register;
      if it has not, load said variable to an general purpose register on said processor indicated as available by the resource manager table;
      if it has, load said variable to a general purpose register if a general purpose register is indicated as available by the resource manager table or load said variable to a special purpose register indicated as available if no general purpose register is indicated as available by the resource manager table.

3. A method for reusing special purpose registers as general purpose registers, with the registers included on a processor having a fixed number of general purpose registers (GPRs) a plurality of special purpose registers, with available special purpose registers not in current use being in an off state, and with the general purpose registers having greater storage capacity than the special purpose registers, and with the special purpose registers being address and buffer registers for holding data read from and written to an internal tank RAM, and where the method is performed by a loader routine executed by a computer, said method comprising the steps of:
   maintaining a resource manager table maintaining availability status of general and special purpose registers;
   determining whether a variable to be loaded to the processor has been declared as a special GPR type variable indicating that the variable is of a size that may be stored in a special purpose register;
   if it has not, loading said variable to an general purpose register on said processor indicated as available by the resource manager table;
   if it has, loading said variable to a general purpose register if a general purpose register is indicated as available by the resource manager table or loading said variable to a special purpose register indicated as available if no general purpose register is indicated as available by the resource manager table.

4. A method for reusing special purpose registers as general purpose registers (GPRs), with the registers included on a processor having a fixed number of general purpose registers and a plurality of special purpose registers, with available special purpose registers not in current use being in an off state, and with the general purpose registers having greater storage capacity than the special purpose registers, and where the method is performed by a loader routine executed by a computer, said method comprising the steps of:

maintaining a resource manager table maintaining availability status of general and special purpose registers;

determining whether usage of a variable to be loaded to the processor has been declared, and if so, determining whether the variable is of a size that can be stored in a special purpose register;

if it can not, loading said variable to an general purpose register on said processor indicated as available by the resource manager table;

if it can, loading said variable to a general purpose register if a general purpose register is indicated as available by the resource manager table or loading said variable to a special purpose register indicated as available if no general purpose register is indicated as available by the resource manager table.

5. A method for reusing special purpose registers as general purpose registers, with the registers included on a processor having a fixed number of general purpose registers (GPRs) and a plurality of special purpose registers, with available special purpose registers not in current use being in an off state, and with the general purpose registers having greater storage capacity than the special purpose registers, and where the method is performed by a loader routine executed by a computer, said method comprising the steps of:

maintaining a resource manager table maintaining availability status of general and special purpose registers;

determining whether a variable to be loaded to the processor has been declared as a special GPR type variable indicating that the variable is of a size that may be stored in a special purpose register;

if it has not, loading said variable to an general purpose register on said processor indicated as available by the resource manager table;

if it has, loading said variable to an available special purpose register.

\* \* \* \* \*